United States Patent
Harms

[19]

[11] Patent Number: 6,142,201
[45] Date of Patent: Nov. 7, 2000

[54] PNEUMATIC TIRE FOR SAND CARS

[76] Inventor: Mark J. Harms, 42198 Avenida Alvarado, Temecula, Calif. 92590

[21] Appl. No.: 09/161,465

[22] Filed: Sep. 28, 1998

[51] Int. Cl.$^7$ .............................. B60C 3/06; B60C 11/03; B60C 11/04; B60C 105/00; B60C 111/00
[52] U.S. Cl. .................................. 152/209.8; 152/209.13; 152/209.15; 152/456
[58] Field of Search ..................................... 152/154, 454, 152/455, 209.1, 209.12, 209.13, 209.15, 209.16, 901, 523, 209.8, 456; D12/134, 136, 141, 145, 152

[56] References Cited

U.S. PATENT DOCUMENTS

| | | | |
|---|---|---|---|
| Re. 18,638 | 10/1932 | Michelin | 152/454 |
| 452,001 | 5/1891 | Yagn | 152/154 |
| 2,249,637 | 7/1941 | Rietz | 152/454 |
| 2,281,359 | 4/1942 | Kenner | 152/209.8 |
| 2,340,258 | 1/1944 | Brunner | 152/901 |
| 2,612,929 | 10/1952 | Yeggy | 152/209.8 |
| 2,698,566 | 1/1955 | Stough | 152/454 |
| 3,946,784 | 3/1976 | Keith | 152/209.8 |

FOREIGN PATENT DOCUMENTS

| | | | |
|---|---|---|---|
| 38887 | 11/1924 | Norway | 152/209.8 |

OTHER PUBLICATIONS

Blow, *Rubber Technology and Manufacture*, pp. 349–356, 1971.
1984 Tread Design Guide, vol. 19, 1984, Published by Tire Guides, Inc., pp. 218–225.
Sand Sports, vol. 4, No. 2, Jul. 1998, pp. 63, 71.
Dick Cepek, 1993 Catalog, p. 16.

*Primary Examiner*—Steven D. Maki
*Attorney, Agent, or Firm*—Miles & Stockbridge P.C.; Edward J. Kondracki

[57] ABSTRACT

A pneumatic tire for a sand car including a reinforced carcass having a tread support portion and opposed sidewalls, and a body of elastomeric material vulcanized to the carcass defining an asymmetric tread. The tread includes a single, generally radially extending lug surface laterally offset from the center plane of the tire and extending around its outer periphery.

13 Claims, 1 Drawing Sheet

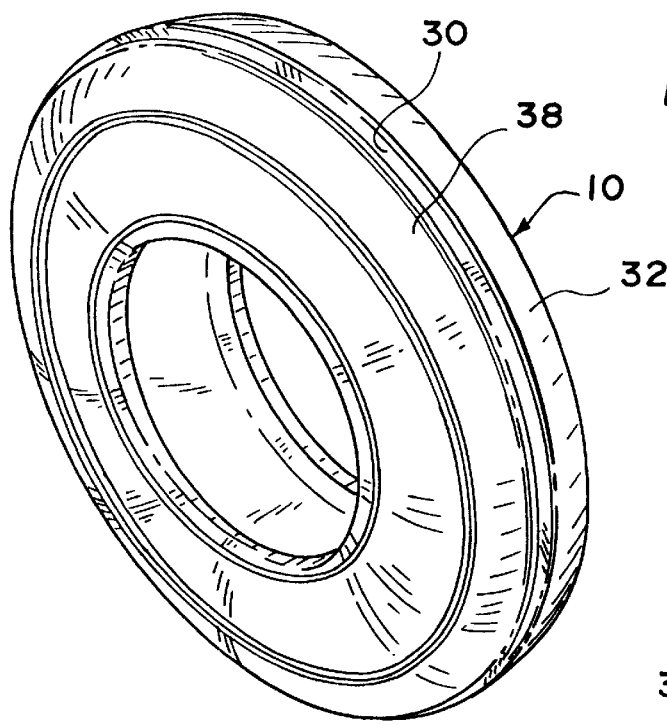
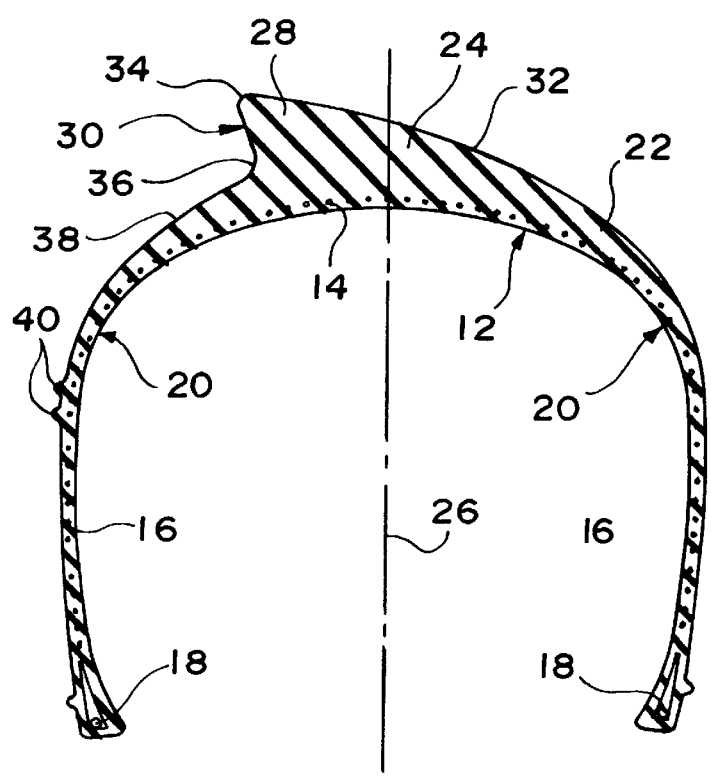
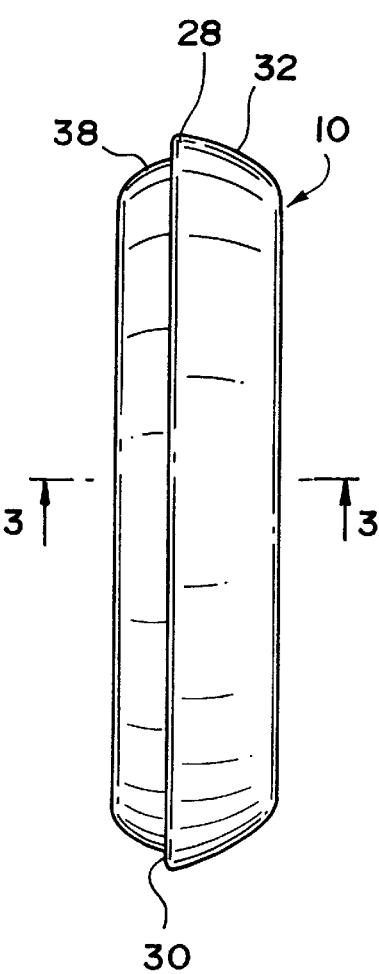
FIG. 1
FIG. 2
FIG. 3

PNEUMATIC TIRE FOR SAND CARS

BACKGROUND OF THE INVENTION

1. Field of the Invention

This invention relates to pneumatic tires for use on off-road vehicles and more particularly to improve pneumatic tires especially suitable for use on the front wheels of sand cars.

2. Description of the Prior Art

The sport of sand duning has grown rapidly in recent years, with a consequent increase in the demand for equipment used in the sport and for improved performance of the vehicles involved. For example, a complete line of tires has been developed for the two, three, and four-wheeled sand vehicles used in the sport. In the past, emphasis has been placed primarily on the development of tires for the rear, or driven wheels to provide increased traction in the loose sand where such vehicles are commonly driven. Less emphasis has been placed on tires for the front wheels of the typical four-wheel dune buggy or the increasingly popular sand rail vehicles (hereinafter collectively referred to as sand cars). Indeed, it has been the common practice to use tires designed for wheels of farm implements as the front tires of sand cars.

The front wheel tires of sand cars, whether of the farm implement type or tires especially designed for such vehicles, typically have relatively smooth or annularly grooved tread surfaces, or treads of the mohawk style having a single central annular raised lug and substantially smooth surfaces on each lateral side of the lug to minimize the amount of sand thrown up by the tires. This plume or roost of loose sand strikes the vehicle and erodes or damages the decoratively finished outer side panels of the vehicles as well as damaging the under surfaces. Also, and particularly for sand rail type vehicles, sand thrown inwardly by the front tires enters the open passenger compartment, striking the passengers and damaging the upholstery and other surfaces.

It is also known to employ completely smooth tread surfaces such as those of the Smoothie tire marketed by Sand Tires Unlimited. The smooth surfaces of such tires minimizes the amount of sand thrown by the front wheels and is gaining popularity among sand car enthusiasts even though such smooth surface tires may give slightly less lateral traction than, for example, a mohawk style tread. It is, therefore, an object of the present invention to provide an improved pneumatic tire for use on the front wheels of sand cars.

Another object is to provide such an improved pneumatic tire which provides maximum maneuverability of the vehicle while minimizing the amount of sand lifted or thrown up by the tire.

Another object is to provide such a pneumatic tire having an improved tread design in which the sand thrown by the tire is primarily expelled laterally from the sides of the vehicle rather than inwardly beneath the vehicle.

SUMMARY OF THE INVENTION

In the attainment of the foregoing and other objects and advantages, an important feature of the invention resides in providing a conventional sand car front tire carcass with an improved tread to provide increased steering control and minimize the amount of sand thrown up by the tire. The tread includes a single, generally axially or laterally directed annular lug surface extending around the periphery of the tire, with the tread surface on each side of the lug preferably being substantially smooth and curved to the sidewall of the tire. Preferably the single lug surface is offset from the vertical center plane of the tire, and the tires are mounted on the sand car with the offset lug surface directed toward and located closer to the outside of the vehicle. The profile of the tire thus resembles a smooth sand car vehicle front tire on each side of the lug surface, with the diameter of the tread being greater on the inboard side of the tire, and with the larger diameter portion of the tire extending from the lug surface inwardly of the vehicle past the vertical center plane to the inner sidewall of the tire.

The asymmetrical design of the tread provides the benefit of a larger profile tire surface on the inboard portion of tire while the smaller diameter outboard portion of the tire tread, in combination with the single generally radially extending outwardly directed lug face provides a rudder-like effect helping to steer the sand car through turns. Further, any sand thrown by the tire is primarily directed outwardly away from the side panels of the vehicle, with a minimum of sand thrown inwardly beneath and into the vehicle. At the same time, during straight runs, the larger diameter portion of the tire acts substantially as a conventional smooth sand car front tire so that normal handling of the vehicle is not affected. The increased diameter also provides a slight increase in vehicle clearance.

BRIEF DESCRIPTION OF THE DRAWINGS

Other features and advantages of the invention will be apparent from the detailed description contained herein below, taken in conjunction with the drawings, in which:

FIG. 1 is an isometric view of a sand car front tire embodying the improved tread configuration of the invention;

FIG. 2 is a front elevation view of the tire shown in FIG. 1; and

FIG. 3 is a fragmentary sectional view taken on line 3—3 of FIG. 2.

DESCRIPTION OF THE PREFERRED EMBODIMENT

Referring now to the drawings in detail, a tire intended for use as a front tire on a sand car and embodying the present invention is designated generally by the reference numeral 10 and comprises a reinforced carcass 12 having a tread support portion 14 and generally radially inwardly extending opposed sidewall portions 16 each terminating in a reinforced bead 18. Tread support portion 14 and sidewall portions 16 are integrally joined at transitional or shoulder areas indicated generally by the arrows 20 to provide a smooth generally dome-shaped or curved profile to the inner surface of the tread support portion of the tire, as seen in cross section in FIG. 3. A coating or layer of elastomeric material 22 extends over and is vulcanized to the outer surface of the carcass 12 with the elastomeric coating being thicker in the tread area and being shaped to provide the unique tread 24 described more fully herein below.

As seen in FIG. 3, the tire carcass 12 is symmetrical on opposed sides of its vertical center plane 26, i.e., a plane perpendicular to the axis of rotation of the tire and located midway between the sidewall 16; however, the elastomeric layer 24 integrally vulcanized to the carcass is asymmetrical at least in the portion thereof defining the tread or ground engaging portion of the tire.

The tread comprises a single annular lug 28 having a generally radial face surface 30 extending completely around the tire periphery in laterally offset relation to the center plane 26 in the direction of one of the sidewalls 16. From the radially outer or maximum diameter portion of lug surface 30, the tread extends in a substantially smooth curved surface 32 to the shoulder portion 20 of the sidewall 16 on the side of center plane 26 opposite the lug surface 30. Lug surface 30 terminates at its outer edge in an arcuate portion 34 which blends smoothly into surface 32 at the maximum diameter portion of the tire.

Lug surface 30 terminates at its radially inner edge portion in a second smooth arcuate portion 36 which blends smoothly into a second smooth curved surface area or portion 38 extending from the lug to the shoulder portion of the tire on the same side of the center plane as the surface 30.

Preferably the generally radially extending lug surface 30 is laterally offset from center plane 26 by a distance of up to about ⅙ of the tire width. For example, for a 6.75×15 tire, the lateral offset of the ring-shaped lug surface preferably should be at least about 1 inch and more preferably this distance will be about 1½ inches. For a tire of this type, the maximum diameter at the juncture of the surface 32 and the outer curved edge 34 of the ring-shaped surface may be about ⅓ inch greater than the diameter at the vertical center plane. These dimensions are, of course, merely illustrative of one embodiment of the tire which has been successfully used on sand cars, and various modifications of these dimensions might be used depending upon the results desired. Decorative designs or informational material may be molded on the outwardly directed sidewall as indicated at 40.

While the surface 30 is referred to as being a generally radially surface, i.e., generally parallel to the center plane at 26, it is preferable that this surface be slightly frusto-conical to provide a slight overhang at the maximum diameter edge portion to provide increased steering control in turns, and to permit greater flexibility of the outer portion of the lug 28 when driving in a straight line.

By providing a smooth curved surface 32 extending from the outer edge of the ring-like lug surface to the tire shoulder on the opposite side of the center plane 26, the tire will operate substantially as a conventional smooth tire and throw a minimum of sand during normal driving. Since the tire is always mounted with the surface 30 directed outwardly of the vehicle, sand raised by the outer portion of the tire will be expelled laterally from the vehicle rather than directly upward behind the tire and into the side of the car. At the same time, when the car is steered into a turn, the outwardly facing lug surface will bite into the sand and act as a rudder in steering out of the turn and provide greater lateral stability to the sand car.

While a preferred embodiment of the invention has been illustrated and described, it is understood that various modifications might be made. For example, while surfaces 32 and 38 are described as being substantially smooth curved surfaces, it is understood that completely smooth surfaces are not required. Accordingly, it is understood that the invention is not limited to the disclosed embodiment, but rather it is intended to include all embodiments which would be apparent to one skilled in the art and which come within the spirit and scope of the invention.

What is claimed is:

1. A pneumatic tire for a sand car, said tire including a reinforced carcass having a tread support portion and opposed sidewalls, and a body of elastomeric material vulcanized to said carcass defining a tread, said tread being asymmetrical with respect to the center plane of the tire and comprising:

a single continuous, generally radially extending ring-shaped lug surface extending around the periphery of the tire, and a pair of substantially smooth curved surfaces extending from said lug surface, one to each sidewall of the tire, wherein one of the substantially smooth curved surfaces is convex and extends across the center plane of the tire, and wherein said lug surface is offset laterally from the center plane of the tire toward one said sidewall, said lug surface having radially spaced inner and outer edge portions, said outer edge portion extending laterally from said center plane a distance greater than said inner edge portion so that said lug surface includes an undercut lug surface between said outer edge portion and said inner edge portion extending around the periphery of the tires said undercut lug surface being a substantially frusto-conical surface portion.

2. A pneumatic tire for use as a front tire on a sand car, the tire having a tread formed from a elastomeric material carried on a reinforced tire carcass including an outwardly directed tread support portion and opposed sidewalls integrally joined with the tread support portion and terminating at their inner periphery in reinforced beads for mounting on a wheel, said carcass being substantially symmetrical about a center plane perpendicular to its axis of rotation when mounted on a wheel, the tread extending over the tread support portion to the sidewalls completely around the tire, the improvement wherein said tread comprises:

a first substantially smooth tread surface extending from one sidewall over a first portion of said tread support portion of the carcass, a second convex substantially smooth tread surface extending from the other sidewall, over a second portion of said tread support portion of the carcass and across the center plane of the tire, and, a generally radially extending ring-shaped lug surface joining said first and second substantially smooth tread surfaces around the periphery of the tire at a location laterally offset toward one sidewall from the center plane of the tire and having radially spaced inner and outer edge portions, said outer edge portion extending laterally from said center plane a distance greater than said inner edge portion so that said lug surface includes an undercut lug surface between said outer edge portion and said inner edge portion extending around the periphery of the tire, said undercut lug surface being a substantially frusto-conical surface portion.

3. The tire defined in claim 2 wherein said second smooth tread surface defines the maximum diameter of the tire at a location adjacent said ring-shaped lug surface.

4. The tire defined in claim 3 wherein said second smooth tread surface extends transversely of said tread support portion of the carcass a distance substantially twice as great as said first smooth tread surface.

5. The tire defined in claim 4 wherein said ring-shaped lug surface includes a generally arcuate outer edge portion smoothly joining said second substantially smooth tread surface and a generally arcuate inner edge portion smoothly joining said first substantially smooth tread surface.

6. A pneumatic tire for use as a front tire on a sand car, the tire having a tread formed from a elastomeric material carried on a reinforced tire carcass including an outwardly directed tread support portion and opposed sidewalls integrally joined with the tread support portion and terminating at their inner periphery in reinforced beads for mounting on a wheel, said carcass being substantially symmetrical about a center plane perpendicular to its axis of rotation when mounted on a wheel, the tread extending over the tread support portion to the sidewalls completely around the tire, the improvement wherein said tread comprises:

a single lug extending completely around the periphery of the tread, said single lug having an annular, ring-shaped lug surface laterally offset from and directed away from said center plane and having radially spaced inner and outer edge portions, a first curved tread surface extending from said inner edge portion to the sidewall closest to said laterally offset ring-shaped lug surface, and a second convex curved tread surface extending from said outer edge portion across the center plane of the tire to the sidewall furthest from said ring-shaped lug surfaces said outer edge portion being spaced laterally from said center plane a distance greater than said inner edge portion so that said ring-shaped lug surface includes an undercut lug surface between said outer edge portion and said inner edge portion extending around the periphery of the tires said undercut lug surface being a substantially frusto-conical portion surface portion.

7. The tire defined in claim 6 wherein said first and second tread surfaces are substantially smooth, and the maximum diameter of said tread is defined by said second substantially smooth curved surface at a location adjacent said outer edge portion.

8. The tire defined in claim 6 wherein said inner and outer edge portions are substantially arcuate in cross section and blended smoothly into said first and second curved tread surfaces, respectively.

9. The tire defined in claim 6 wherein said offset of said shaped lug surface from said center plane is a finite distance which is not greater than about one-third the distance between the center plane to the sidewalls of the tire.

10. The tire defined in claim 6 wherein said substantially frusto-conical surface portion is substantially parallel to the center plane.

11. The tire defined in claim 10 wherein said outer edge portion spaced laterally from said center plane a distance greater than said inner edge portion provides an overhang portion at a maximum diameter of the second surface.

12. The tire defined in claim 11 wherein said second curved tread surface extends transversely of a ground engaging portion a distance of at least about twice the distance of said first smooth curved surface.

13. The tire defined in claim 7 wherein said ring-shaped lug surface is laterally offset from said center plane a distance of about one-third the distance between the center plane and the sidewalls of the tire.

* * * * *